2,881,221

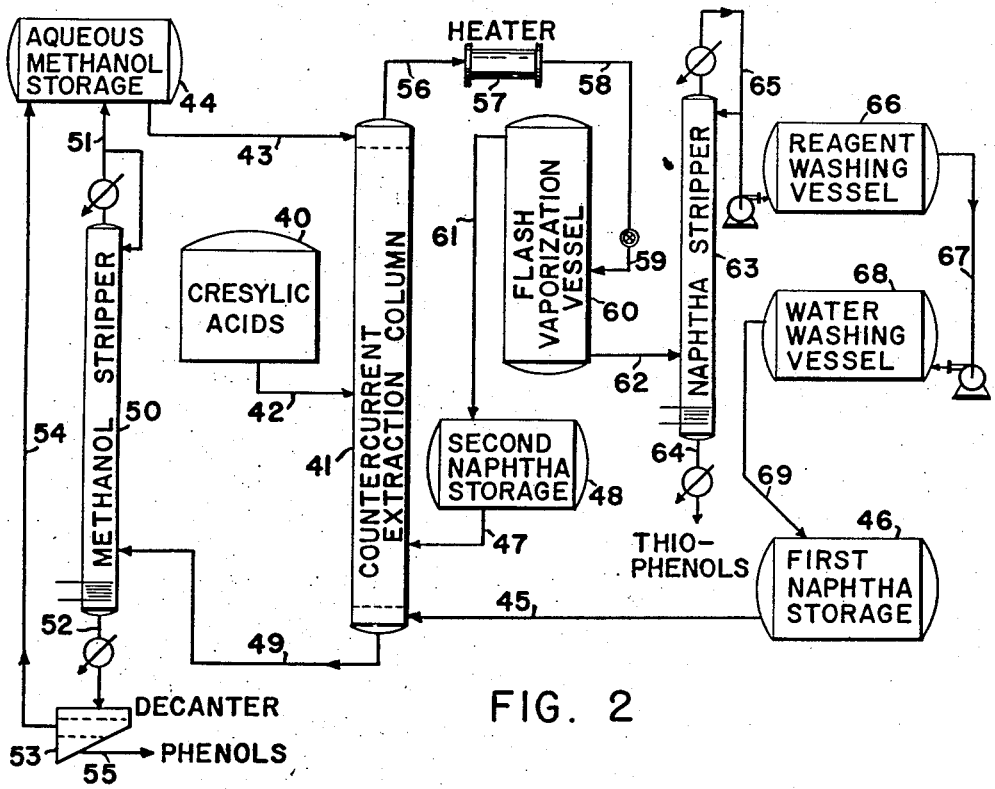
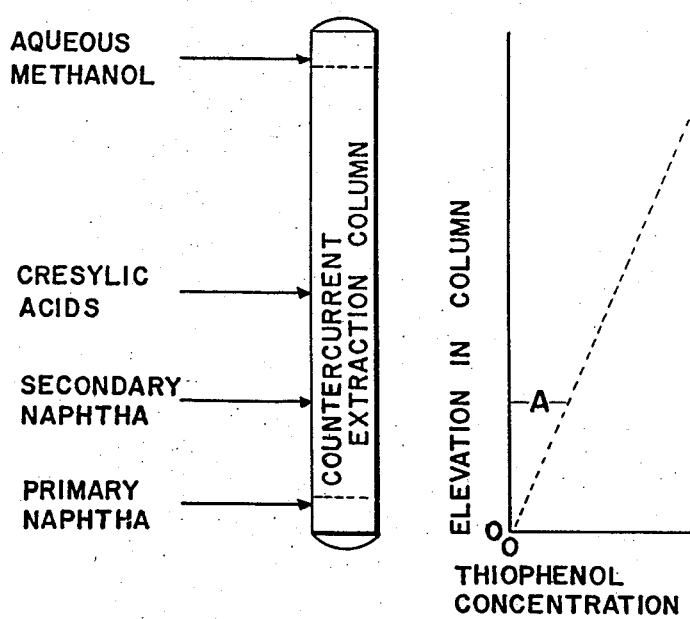
FIG. 3
INVENTORS
Martin B. Neuworth
Benjamin W. Jones
Donald C. Jones
BY *Harry B. Keck*
ATTORNEY

United States Patent Office 2,881,221
Patented Apr. 7, 1959

PURIFICATION OF CRESYLIC ACIDS

Martin B. Neuworth and Donald C. Jones, Pittsburgh, Pa., and Benjamin W. Jones, Cranford, N.J., assignors to Consolidation Coal Company, Pittsburgh, Pa., a corporation of Pennsylvania Application October 31, 1955, Serial No. 543,958

5 Claims. (Cl. 260—621)

The present invention relates to a process for separating thiophenols from phenols by means of double solvent extraction. More particularly, the present invention relates to a solvent recovery technique for improving the separation efficiency of such a process.

A double solvent extraction process for separating thiophenols from phenols has been described in copending application Serial Number 372,972, filed August 7, 1953, entitled "Separation of Thiophenols and Tar Acids," now U.S. Patent 2,767,220, by Martin B. Neuworth, a joint inventor of the present process. According to the process described therein, a feedstock comprising phenols contaminated with thiophenols is introduced into a double solvent extraction system and contacted with an aqueous methanol solution and a paraffinic naphtha under liquid phase separating conditions. The phenols are selectively recovered in an aqueous methanol extract from which they are separated by stripping of the methanol and subsequent removal of water. The water and methanol are recombined for reuse in the process as the aqueous methanol solvent. Thiophenols are recovered from the extraction zone in a naphtha solution from which they are recovered by stripping the naphtha. The recovered naphtha is available for reuse in the process as a solvent.

We have subsequently discovered that, contrary to expectations, the paraffinic naphtha solvent (boiling below 130° C.) cannot be separated by distillation alone from the thiophenols (the lowest boiling of which boils at 168° C.) in this process. The paraffinic naphtha solvent recovered from the extraction process contains in addition to the thiophenols some disulfides, a small quantity of phenols and trace quantities of water and methanol. These additional materials apparently are responsible for this difficulty in separation of naphtha from thiophenols by distillation, since it is known that paraffinic naphtha can be separated easily by distillation from admixture with thiophenols alone. The paraffinic naphtha which is recovered by distillation contains small quantities of thiophenols which do not prevent its reuse in solvent extraction processes which do not require highly efficient elimination of impurities from product phenols. Nevertheless, where the extraction process is expected to produce product phenols with negligible thiophenol contamination, it is essential that high purity naphtha be employed as solvent in the extraction process.

In order to appreciate the order of magnitude of contamination under discussion, the double solvent extraction treatment of cresylic acids described in the above-mentioned copending patent application was carried out with aqueous methanol and naphtha (chemically free of thiophenols and disulfides) as solvents. The cresylic acids had the following composition:

| | Percentage by weight |
|---|---|
| Phenols | 84 |
| Thiophenols | 14 |
| Disulfides | 1 |
| Neutral oils | 1 |
| Total | 100 |

The product phenols recovered from the aqueous methanol extract contained only 0.002 weight percent thiophenols and disulfides as contaminants. The naphtha solution of thiophenol resulting from the extraction treatment had the following composition:

| Component: | Weight percent |
|---|---|
| Naphtha (a hexane fraction of petroleum naphtha boiling between 60 and 130° C.) | 92.2 |
| Phenols | 0.98 |
| Thiophenols (reported as thiophenol)[1] | 3.83 |
| Disulfides (reported as thiophenol)[1] | 0.23 |
| Neutral oil | 1.21 |
| Methanol | 1.55 |
| Water | Trace |
| Total | 100.00 |

[1] In analysis for thiophenols, all calculations were based upon the properties of thiophenol itself. Similarly in analysis for disulfide, the material is first converted to the corresponding thiophenols to simplify analytical procedures. The disulfides calculations were based upon the corresponding thiophenols resulting from the analytical technique.

This naphtha solution was distilled in a one inch x four feet precise distillation column having an efficiency equivalent to 100 plates at total reflux. Distillation was carried out at a reflux ratio of 25 until a head temperature of 80° C. was attained. The distillate contained 0.03 percent by weight of thiophenols and disulfides. Thus, extremely efficient distillation reduced the naphtha contamination from 4.06 to 0.03 weight percent of thiophenols and disulfides.

When this distilled hexane was reemployed as solvent in the cresylic acids extraction process, the product phenols recovered in aqueous methanol contained 0.017 weight percent thiophenols and disulfides. Feedstock in both instances was derived from the same batch. Thus the presence of 0.03 weight percent thiophenols and disulfides in the hexane solvent increased the contamination of product phenols resulting from the extraction process from 0.002 to 0.017 weight percent thiophenols and disulfides.

According to the present invention we have provided a method for removing thiophenols from the recycle naphtha to permit its reuse in the extraction process without adversely affecting the purity of the phenols recovered as product therefrom. We propose to reduce the thiophenol contamination of the recycle naphtha stream by washing at least a portion of the stream with a reagent for exhaustively stripping the thiophenols from the naphtha. The washing reagent should be immiscible with the naphtha solvent. The washing reagent may be an aqueous solution of an alkali metal hydroxide or a concentrated sulfuric acid. The use of concentrated sulfuric acid has an advantage over the use of aqueous alkali metal hydroxide in that the concentrated sulfuric acid will remove disulfides in addition to thiophenols from the naphtha solution. However the presence of small quantities of water in the naphtha solution serves to dilute the concentrated sulfuric acid thereby reducing its effectiveness and preventing full realization of its potential absorption capacity.

In a further embodiment of the present invention, the naphtha solution containing thiophenols is subjected to a flash vaporization for separation into an overhead stream of naphtha containing small quantities of thiophenols and disulfides and a bottom stream containing naphtha along with the bulk of the thiophenols and disulfides removed by the naphtha from the original cresylics feedstock in the extraction process. The flashed naphtha in its contaminated condition is reused as solvent in the extraction zone between the ends thereof. The bottoms stream from the flash vaporization is subjected to a precise distillation to separate (a) thiophenols and disulfides as a bottom product and (b) as an overhead product naphtha which is only very slightly contaminated with thiophenols and disulfides. The last mentioned overhead stream is subjected to treatment with chemical reagents for thiophenol removal. Thus-treated naphtha substantially free of thiophenol contamination, is reused as solvent in the extraction zone at one end thereof.

For a clear understanding of the present invention, its objects and advantages, reference should be had to the following description and accompanying drawings in which:

Figure 2 is a diagrammatic illustration of apparatus adapted for carrying out an alternative embodiment of the present invention; and Figure 3 is a diagrammatic illustration of an extraction tower employed as the primary extraction zone illustrating graphically the manner in which thiophenol contamination varies throughout the extraction tower.

Figure 1:
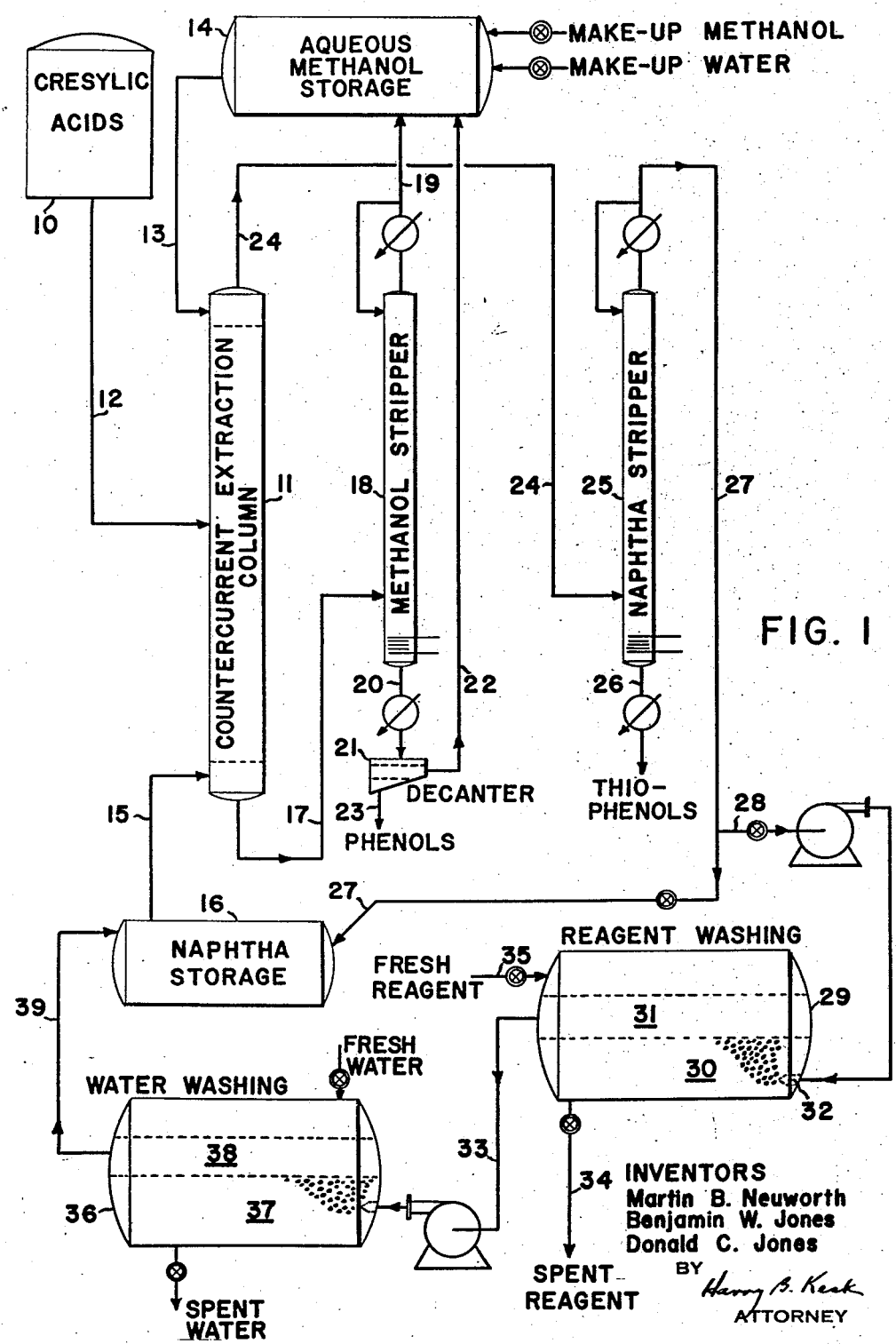
Figure 1 is a diagrammatic illustration of apparatus adapted for carrying out the preferred embodiment of the present invention.

The present invention is particularly suitable for treatment of petroleum cresylics which are phenolic and thiophenolic materials derived from cracked mineral oil. Cresylic acids may, in addition, contain small quantities of disulfides which are neutral materials along with small quantities of neutral oils. The thiophenol content of petroleum cresylics ranges from about 5 to about 25 percent by weight, and may be even higher in the case of cresylics resulting from refining of high sulfur content petroleum.

The process also is adaptable to the treatment of phenolic materials contaminated with thiophenols regardless of the source, for example, those derived from coal tars, especially low temperature carbonization tars.

The cresylic acid feedstock preferably is topped to about 160° C. to eliminate low boiling sulfur compounds which might contaminate the solvents. This topping does not affect phenolic recovery since the lowest boiling phenol boils at about 180° C.

Referring to Figure 1, a feedstock containing cresylic acids and thiophenols is introduced from a storage tank 10 into a center feed, countercurrent extraction tower 11 through a conduit 12. Aqueous methanol solution containing from 40 to 90 percent by weight of methanol and the balance water is introduced into the top of the extraction column 11 through a conduit 13 from an aqueous methanol supply tank 14. Paraffinic naphtha having a boiling range of 60 to 130° C. and a density of less than 0.8 is introduced into the bottom of the extraction column 11 through a conduit 15 from a naphtha storage tank 16. The preferred naphtha solvent is a hexane distillate fraction of petroleum naphtha. In general from 0.5 to 5.0 volumes of aqueous methanol and from 0.5 to 5.0 volumes of naphtha should be employed for each volume of cresylic acids in the feedstock. The aqueous methanol solution passes downwardly through the column 11 and selectively dissolves phenols which are recovered in aqueous methanol solution from the bottom of the extraction tower 11 through the conduit 17 and passed to a methanol stripper 18 which separates methanol as an overhead stream for recovery through a conduit 19. Methanol passes through conduit 19 to the aqueous methanol storage tank 14 for reuse in the process. The bottom stream from the stripper 18, containing phenols and water, passes through a conduit 20 to a decanter 21 wherein a phase separation occurs between the water and the phenols. Water is recovered through conduit 22 and returned to the aqueous methanol storage tank 14 for reuse in the process. Purified phenols are recovered from the decanter 21 through a conduit 23 as product.

Reverting to the extraction tower 11, paraffinic naphtha passes upwardly through the tower selectively dissolving thiophenols which are recovered in naphtha solution at the top of tower 11 through a conduit 24 and passed to a naphtha stripper 25. The bottom product from the naphtha stripper 25 passes through a conduit 26 for recovery as thiophenols along with disulfides and any neutral oils which may be present in minor quantities in the feedstock. The overhead stream from the stripper 25 contains essentially paraffinic naphtha solvent which is contaminated with thiophenols to a slight extent. The overhead stream 27 is returned to the naphtha storage tank 16 for reuse in the process.

Thus far we have described briefly the process of the aforementioned copending patent application. According to our subsequent discovery, the recycle naphtha in conduit 27, containing small quantities of thiophenols, will interfere with the operation of the extraction tower 11 and permit slight contamination of the phenols removed through conduit 17 from the extraction tower 11. The slight contamination of product phenols is not deleterious in most cases, but is significant when extremely high purity product phenols are required as hereinbefore described.

According to the present invention, the overhead stream of naphtha from the conduit 27 is passed through a conduit 28 into a reagent washing vessel 29 which contains concentrated sulfuric acid or an aqueous solution of alkali metal hydroxide. As the paraffinic naphtha is contacted with the chemical reagent within the vessel 29, any thiophenols will be removed and retained in the reagent phase 30. The naphtha, being immiscible with and lighter than the chemical reagent, forms a supernatant liquid layer 31 within the vessel 29. We prefer to introduce the naphtha from the conduit 28 into the vessel 29 through a spray nozzle 32 which is maintained below the upper surface of the reagent phase 30. This technique assures intimate contacting between the naphtha undergoing treatment and the treating reagent; yet permits maintenance of quiescence within the vessel 29 to permit phase separation between the naphtha layer 31 and the reagent phase 30.

It is essential that the vessel 29 be maintained free of oxidation promoters such as rust, and free of oxidizing gases such as air. The presence of oxidizing agents or oxidation promoters will result in the conversion of thiophenols to disulfides which cannot be removed from the naphtha by means of aqueous alkali solutions. Treated naphtha, free of thiophenol contamination, is removed from the vessel 29 through a conduit 33 which is in communication with the naphtha layer 31. The reagent washing vessel 29 is cyclically emptied and filled to maintain a high level of reagent activity. Spent reagent is removed through a conduit 34 and fresh reagent added through a conduit 35.

Reagent-washed naphtha is recovered through conduit 33 and passed to a water washing vessel 36 for removal of any chemical reagents which may have become entrained in the naphtha during treatment in the reagent washing vessel 29. The reagent-washed naphtha is introduced beneath the surface of a water phase 37 and allowed to rise to form a supernatant liquid phase 38 which is withdrawn through a conduit 39 and returned to the naphtha storage vessel 16 free of thiophenol contamination for reuse in the process. The washing vessel 36 preferably is of similar construction to the washing vessel 29.

The total removal of thiophenol contamination from the recovered solvent naphtha as described permits maximum efficiency of cresylics separation in the extraction tower 11. Where a high purity of product phenols is required which is less than the maximum obtainable purity, a portion of the naphtha from the conduit 27 may be passed directly to the naphtha storage vessel 16 whereby only a portion of the solvent recycle stream need be chemically treated in the washing vessels 29 and 36. The relative quantities of recycle solvent subjected to reagent washing through conduit 28 depends upon the desired purity of product phenols recovered from the solvent extraction process. Purity of product can be correlated with thiophenol contamination of the naphtha solvent for any particular feedstock and operating conditions within the extraction tower 11.

When the cresylic acid feedstock contains such small quantities of thiophenol contaminants that recovery of thiophenols is not economically feasible, the contaminated naphtha stream in the conduit 24 may be treated exclusively by reagent washing for removal of thiophenols. Phenols derived from low temperature carbonization tars, for example, contain less than 0.5 weight percent of thiophenols which must be eliminated in order to permit marketing of phenols, yet which are present in quantities too small to justify their recovery. When treating such feedstocks, the naphtha stream in the conduit 24, containing virtually all thiophenols from the feedstock, may be passed directly to the conduit 28 for reagent washing whereby distillation of the recirculating naphtha solvent is avoided.

A further improved embodiment of the solvent extraction process for recovering phenols free of thiophenol contamination is illustrated in Figure 2. In this embodiment the recycle naphtha stream is separated into two fractions by simple, inexpensive flash vaporization and is recovered in two streams for reuse as solvent. As shown in Figure 2 a cresylic acids feedstock containing phenols and thiophenols is introduced from a storage tank 40 into a center feed, countercurrent extraction column 41 through a conduit 42. Aqueous methanol solution is introduced into the top of the extraction column 41 through a conduit 43 from an aqueous methanol supply tank 44. Paraffinic naphtha boiling in the range of 60 to 130° C. and having a density of less than 0.8 is introduced into the bottom of the extraction column 41 through a conduit 45 from a first naphtha storage tank 46. The naphtha contained in the first naphtha storage tank 46 has been exhaustively stripped of thiophenols by chemical washing. Additional naphtha is introduced into the extraction tower 41 through a conduit 47 from a second naphtha storage tank 48 which contains naphtha having a small quantity of thiophenolic contaminants. The second naphtha stream in conduit 47 is introduced into the tower 41 at a point above the bottom thereof where its contamination level is equal to or less than the thiophenol contamination of naphtha existing at that point within the tower 41.

The aqueous methanol solution passes downwardly through the column 41 dissolving phenols which are recovered in the aqueous methanol solution from the bottom of the extraction tower 41 through a conduit 49. Aqueous methanol solution containing phenols passes through conduit 49 to a methanol stripper 50 which separates methanol as an overhead stream for recovery through a conduit 51 which returns methanol to the aqueous methanol storage tank 44 for reuse in the process. The bottom stream from the stripper 50, containing phenols and water, passes through a conduit 52 to a decanter 53 wherein a phase separation occurs between the water and the phenols. Water is recovered through conduit 54 and returned to the aqueous methanol storage tank 44 for reuse in the process. Purified phenols are recovered from the decanter 53 through a conduit 55 as product.

Reverting to the extraction tower 41, paraffinic naphtha passes upwardly through the tower selectively dissolving thiophenols which are recovered in naphtha solution from the top of the tower 41 through a conduit 56. The naphtha solvent in the conduit 56 contains the thiophenols from the feedstock. The naphtha solution of thiophenols is passed through a fluid heater 57 wherein the naphtha stream is heated under pressure and passed through a conduit 58 and an expansion nozzle 59 and allowed to flash into a flash vaporization vessel 60. From about 30 to about 80 percent by weight of the naphtha in the conduit 58 is flashed overhead (preferably about 50 percent by weight) through a conduit 61 and condensed and collected in the second naphtha storage vessel 48. The remainder of the naphtha stream, accumulating as a liquid phase in the flash vaporization vessel 60, comprises unflashed naphtha and all but a very small portion of the thiophenols. The liquid phase is removed from the vessel 60 through a conduit 62 and passed to a naphtha stripper 63. The bottom product of the naphtha stripper 63 passes through a conduit 64 for recovery as thiophenols. The overhead stream from the stripper 63 contains essentially paraffinic naphtha solvent which is contaminated with thiophenols to a very slight extent. The overhead stream passes through a conduit 65 for chemical treatment in a reagent washing vessel 66 corresponding to reagent washing vessel 29 illustrated and described in Figure 1. Reagent-washed naphtha is recovered from the vessel 66 through a conduit 67 and passed to a water washing vessel 68 which corresponds to the water washing vessel 36 described in connection with Figure 1. Paraffinic naphtha solvent, free of thiophenols and chemical reagents, is recovered from the vessel 68 through a conduit 69 and stored in the first naphtha storage vessel 46 for reuse in the process.

The embodiment of this invention illustrated and described in Figure 2 eliminates the need for precise fractionation of the entire recycle naphtha solvent stream. From about 30 to about 80 weight percent, preferably about 50 weight percent, of the recycle naphtha solvent is flash vaporized and recovered slightly contaminated with thiophenols. Hence less fractionating capacity is required for precise distillation of recycle naphtha solvent.

Naphtha solution comprising thiophenols from the extration process contains about 4 weight percent of thiophenols and about 0.25 weight percent of disulfides. Flash distillation of a naphtha solution of thiophenols recovered from the extraction process shows the following results:

*Table I*

| Naphtha flashed, weight percent | Disulfide content of flashed naphtha, weight percent | Thiophenol content of flashed naphtha, weight percent |
|---|---|---|
| 97 | 0.008 | 1.42 |
| 83 | 0.006 | 0.33 |
| 34 | 0.003 | 0.12 |

Referring to Figure 3, a countercurrent extraction column for processing cresylic acids is shown schematically. The graph at the right thereof illustrates the thiophenol concentration of the naphtha solvent at any level of the extraction column. Preferably, as indicated, the contamination is virtually zero at the bottom of the column. As the naphtha solvent passes upwardly through the extraction column it selectively dissolves thiophenols. Thiophenol contamination of the naphtha at the top of the tower (whence it is withdrawn for solvent recovery) can range up to about 15 percent by weight. At some level in the extraction column, indicated in Figure 4 by the letter A, the thiophenol contamination of the naphtha solvent equals or exceeds that of the flashed naphtha (see Table I) recovered from the flash vaporization vessel 60 and stored in the second naphtha vessel 48. That portion of flashed naphtha should be introduced into the extraction column 41 through conduit 47 at the level A, i.e., a level where the thiophenol concentration of the naphtha solvent within the extraction tower equals or exceeds the thiophenol concentration of the flashed naphtha solvent from the second naphtha storage vessel 48.

By employing the flash vaporization technique of the embodiment of the present invention illustrated in Figure 2, the precise distillation capacity of the naphtha stripping column 63 is less than that otherwise required. The required fractionation equipment is less costly to construct and to operate. In addition, the amount of recycle naphtha subjected to chemical purification in the washing vessels 66 and 68 is significantly reduced. These savings are effected without reducing the purity of the product phenols recovered from the overall system. The loss of thiophenols resulting from chemical treatment furthermore is lower by virtue of the reduced quantity of naphtha solvent subjected to the chemical treatment.

As previously mentioned, the chemical treatment may be carried out with aqueous caustic or concentrated sulfuric acid. In general aqueous caustic is preferred since its washing efficiency will not be seriously affected through inevitable dilution with water and methanol carried over from the naphtha stripping tower. Dilution of concentrated sulfuric acid would reduce its effectiveness as a chemical washing reagent and prevent realization of its full capacity as a washing reagent.

Aqueous caustic is suitable for exhaustively removing thiophenols from the naphtha solvent but is ineffective in eliminating any carry-over disulfides in the naphtha. Disulfides generally are neutral materials which are more soluble in the hydrocarbon phase than in the aqueous phase. However, the concentrated sulfuric acid will exhaustively remove both thiophenols and disulfides from naptha solvents. Disulfide build-up in the system is not normally a serious problem since disulfides generally have a higher boiling range and do not pass overhead from the naphtha stripping stage. However, where the feed cresylics have not been prefractionated to remove low boiling disulfides (i.e., those boiling below about 160° C.) disulfides build-up in the recirculating naphtha solvent may become a serious problem. Aqueous caustic washing is inadequate for removing such disulfides and resort must be had to the concentrated sulfuric acid treatment.

This distinction serves to emphasize a further advantage of the embodiment illustrated in Figure 3. Therein aqueous caustic and concentrated sulfuric acid may be used interchangeably for chemical washing of unflashed naphtha solvent recycle. During the flash vaporization of the naphtha solution from the extraction stage, virtually all water and methanol is also flashed overhead. Hence there are no materials available in the unflashed naphtha stream which might dilute the concentrated sulfuric acid.

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:

1. In a continuous solvent extraction process for removing thiophenols from a liquid mixture consisting essentially of about 5 to 25 percent by weight thiophenols and the balance phenols by countercurrently contacting said mixture under extraction conditions in an extraction zone by feeding said mixture to said extraction zone at a point located between the ends thereof, feeding a paraffinic naphtha solvent boiling in the range of 60 to 130° C. and having a density of less than 0.8 to one end of said zone and feeding 40 to 90 percent aqueous methanol to the other end of said zone, the improvement which comprises feeding a first naphtha stream of substantially thiophenol-free naphtha solvent to said one end of said extraction zone, recovering naphtha solution containing extracted thiophenols from the other end of said extraction zone, flash-vaporizing from 30 to 80 percent of the naphtha solvent from said naphtha solution and recovering the flashed naphtha solvent distillate containing a portion of the extracted thiophenols, purifying the naphtha solvent residue from the flash vaporization to remove substantially all thiophenols therefrom and recovering the purified naphtha solvent, recycling said purified naphtha solvent as said first naphtha stream to said one end of said extraction zone, feeding said flashed naphtha solvent distillate as a second naphtha stream to said extraction zone at a point adjacent said one end of said extraction zone and between the feed point of said liquid mixture and said first naphtha stream, the thiophenol contamination level of said second naphtha stream being no greater than the thiophenol contamination of naphtha existing at said point in the extraction zone, and recovering the aqueous methanol solution containing substantially sulfur-free phenols.

2. In a continuous solvent extraction process for removing thiophenols from a liquid mixture consisting essentially of about 5 to 25 percent by weight thiophenols and the balance phenols by countercurrently contacting said mixture under extraction conditions in a vertical centerfeed extraction zone by feeding said mixture to said extraction zone at a point located between the ends thereof, feeding a paraffinic naphtha solvent boiling in the range of 60 to 130° C. and having a density of less than 0.8 to the bottom of said zone and feeding 40 to 90 percent aqueous methanol to the top of said zone, the improvement which comprises feeding a first naphtha stream of substantially thiophenol-free naphtha solvent to the bottom of said extraction zone, recovering naphtha solution containing extracted thiophenols from the top of said extraction zone, flash-vaporizing from 30 to 80 percent of the naphtha solvent from said naphtha solution and recovering the flashed naptha solvent distillate containing a portion of the extracted thiophenols, separating the flash vaporization residue of said naphtha solution into a distillate fraction comprising said naphtha and a distillation residue comprising thiophenols, contacting at least a portion of said distillate fraction sequentially first under non-oxidizing conditions with a chemical reagent substantially immiscible with said naphtha for removing thiophenols from said portion of said distillate fraction and thereafter with water for removing said chemical reagent from said portion of said distillate fraction, thereafter recovering said portion of said distillate fraction substantially free of sulfur as a purified naphtha solvent, recycling said purified naphtha solvent as said first naphtha stream to the bottom of said extraction zone, feeding said flashed naphtha solvent distillate as a second naphtha stream to said extraction zone at a point between the bottom and the centerfeed region of said extraction zone, the thiophenols contamination level of said second naphtha stream being no greater than the thiophenol contamination of naphtha existing at said point in the extraction zone, and recovering the aqueous methanol solution containing substantially sulfur-free phenols.

3. The method of claim 2 in which the chemical reagent is an aqueous solution of sodium hydroxide.

4. The method of claim 2 in which the chemical reagent is concentrated sulfuric acid.

5. In a continuous solvent extraction process for removing thiophenols and organic disulfides from a liquid mixture consisting essentially of about 5 to 25 percent by weight of thiophenols and organic disulfides, with the balance phenols, by countercurrently contacting said mixture under extraction conditions in a vertical centerfeed extraction zone by feeding said mixture to said extraction zone at a point located between the ends thereof, feeding a paraffinic naphtha solvent boiling in the range of 60 to 130° C. and having a density of less than 0.8 to the bottom of said zone and feeding 40 to 90 percent aqueous methanol to the top of said zone, the improvement which comprises feeding a first naphtha stream of substantially sulfur-free naphtha solvent to the bottom of said extraction zone, recovering naphtha solution containing extracted thiophenols and organic disulfides from the top of said extraction zone, flash-vaporizing from 30 to 80 percent of the naphtha solvent from said naphtha solution and recovering the flashed naphtha solvent distillate containing a portion of the extracted thiophenols and organic disulfides, separating the flash vaporization residue of said naphtha solution by distillation into a distillate fraction comprising said naphtha and a distillation residue comprising thiophenols and organic disulfides, contacting at least a portion of said distillate fraction sequentially first under non-oxidizing conditions with concentrated sulfuric acid for removing thiophenols and organic disulfides from said portion of said distillate fraction and thereafter with water for removing sulfuric acid from said portion of said distillate fraction, thereafter recovering said portion of said distillate fraction substantially free of sulfur as a purified naphtha solvent, recycling said purified naphtha solvent as said first naphtha stream to the bottom of said extraction zone, feeding said flashed naphtha solvent distillate as a second naphtha stream to said extraction zone at a point between the bottom and the centerfeed region of said extraction zone, the thiophenol contamination level of said second naphtha stream being equal to or less than the thiophenol contamination of naphtha existing at said point in the extraction zone, and recovering the aqueous methanol solution containing substantially sulfur-free phenols.

References Cited in the file of this patent
UNITED STATES PATENTS

| | | |
|---|---|---|
| 1,718,218 | Cross | June 25, 1929 |
| 2,236,928 | Thomas et al. | Apr. 1, 1941 |
| 2,636,843 | Arnold et al. | Apr. 28, 1953 |
| 2,666,796 | Gorin et al. | Jan. 19, 1954 |
| 2,767,220 | Neuworth | Oct. 16, 1956 |

OTHER REFERENCES

"Science of Petroleum," vol. 3, pp. 1737–8, publ. by Oxford University Press, New York (1938).